United States Patent
Silvestro

(10) Patent No.: US 7,139,643 B2
(45) Date of Patent: Nov. 21, 2006

(54) CONTROL DEVICE WITH SERVOCONTROL LOOP, PARTICULARLY AN ELECTRO-HYDRAULIC FLIGHT CONTROL ACTUATOR

(75) Inventor: Genevieve Silvestro, Eragny (FR)

(73) Assignee: TRW Systemes Aeronautiques Civils, Saint-Quen l'Aumone (FR)

( * ) Notice: Subject to any disclaimer, the term of this patent is extended or adjusted under 35 U.S.C. 154(b) by 0 days.

(21) Appl. No.: 10/346,827

(22) Filed: Jan. 17, 2003

(65) Prior Publication Data

US 2006/0041339 A1     Feb. 23, 2006

(30) Foreign Application Priority Data

Jan. 21, 2002   (FR) .................................. 02 00679

(51) Int. Cl.
  *G05D 3/12*   (2006.01)
  *G06F 19/00*  (2006.01)
(52) U.S. Cl. .................. 701/3; 701/4; 701/12; 700/29; 244/78.1
(58) Field of Classification Search .................... 701/3, 701/4, 8, 12; 700/29, 37, 31, 38; 251/28; 188/280; 244/78.1
See application file for complete search history.

(56) References Cited

U.S. PATENT DOCUMENTS

| 4,227,319 A | * | 10/1980 | Guy et al. ..................... 434/45 |
| 5,063,335 A |   | 11/1991 | Baechtel et al. |
| 5,224,667 A |   | 7/1993  | Lacabanne |
| 5,369,345 A |   | 11/1994 | Phan et al. |
| 5,409,188 A | * | 4/1995  | Takagi et al. ................ 244/195 |
| 5,519,605 A | * | 5/1996  | Cawlfield ..................... 700/31 |
| 5,535,117 A | * | 7/1996  | Hiroi ........................... 700/38 |
| 5,587,899 A | * | 12/1996 | Ho et al. ...................... 700/37 |
| 5,880,953 A |   | 3/1999  | Takeuchi et al. |
| 5,884,894 A | * | 3/1999  | Smith .......................... 251/28 |
| 5,901,059 A | * | 5/1999  | Tao et al. ..................... 700/29 |
| 6,003,811 A | * | 12/1999 | Trikha ....................... 244/78.1 |

FOREIGN PATENT DOCUMENTS

| EP | 60005306 | 1/1985 |
| EP | 2130608  | 5/1990 |
| EP | 0469151  | 2/1992 |
| EP | 0289151  | 11/1998 |
| EP | 11073205 | 3/1999 |

* cited by examiner

*Primary Examiner*—Tan Q. Nguyen
(74) *Attorney, Agent, or Firm*—Blakely Sokoloff Taylor & Zafman

(57) ABSTRACT

A control device includes a main servocontrol loop having a servocontrolled system, and a compensation device on the input side of the control device. The control device includes an internal loop that receives a first signal derived from the main servocontrol loop as input, and generates, as a function firstly of the first signal and secondly of a second signal characteristic of a parameter of the servocontrolled system, an error signal characteristic of the difference between said second signal and a theoretical signal determined using a model. The error signal being injected into the main servocontrol loop to correct the control of the servocontrolled system. The internal loop and/or the main loop include a variable gain amplifier, and the control device controls the gain of the variable gain amplifier.

10 Claims, 1 Drawing Sheet

CONTROL DEVICE WITH SERVOCONTROL LOOP, PARTICULARLY AN ELECTRO-HYDRAULIC FLIGHT CONTROL ACTUATOR

BACKGROUND

1. Field

This invention relates to improvements to servocontrol devices.

In particular, it is useful for electro-hydraulic actuator systems and in particular for actuator systems of this type used for position servocontrol or force servocontrol for flight controls.

2. Description of the Related Art

Conventionally, a position servocontrol device for a flight control actuator comprises a servocontrol loop that incorporates compensation means arranged in the loop on the input side of the servocontrolled system, these compensation means providing filtering particularly at resonant frequencies of movements of the mechanical part(s) actuated by the system.

Performances expected by aeronautical manufacturers from flight control actuators are increasingly selective. It is now difficult to achieve them using simple conventional servocontrol loops.

SUMMARY

The invention proposes a particularly stable servocontrol device that is unaffected by variations of mechanical parameters such as global stiffness or inertia parameters.

The device proposed by the invention also has the advantage that it does not necessitate additional sensors and can operate as a conventional stable system in the case of a failure.

More particularly, the invention proposes a control device comprising a main servocontrol loop that comprises a servocontrolled device, and compensation means on the input side of this servocontrolled device, the said device comprising a secondary loop that receives a signal derived from the servocontrol loop as input, and generates an error characteristic of the difference between a signal characteristic of a parameter of the servocontrolled device and a theoretical signal determined using a model, as a function firstly of this input signal and secondly of the said signal characteristic of a parameter of the servocontrolled device, this error signal being injected into the main loop to correct the control of the servocontrolled device, characterised in that the secondary loop and/or the main loop comprise at least one variable gain amplifier, the said device comprising means for controlling the gain of the said amplifier as a function firstly of the said signal characteristic of a state of the servocontrolled device, and secondly of a signal derived from the main loop on the input side of the said device.

This type of device is advantageously used with the following various different characteristics alone or in any technically possible combination:

the error generated by the secondary loop is an error characteristic of the difference between the output from the servocontrolled device and a theoretically expected output determined using a model;

it comprises means at the output from the secondary loop of non-linear filtering of the said error;

it comprises amplification means at the output from the secondary loop comparison means, the gain of these amplification means corresponding to the gain of the amplifier in the main loop;

the gain of the main loop is fixed, the secondary loop comprising a variable gain amplifier;

the gain of the amplifier in the main loop is fixed, the secondary loop comprising a variable gain amplifier;

the means for controlling the gain of a variable gain amplifier comprise means for applying a simplified model of the secondary loop model, to a signal derived from the main loop;

the secondary loop is input to the main loop at the input of the servocontrolled device;

the secondary loop is input to the main loop on the input side of the compensation means;

the model of the secondary loop uses a phase advance.

Another purpose of the invention is an electro-hydraulic flight control for an aircraft, characterised in that it comprises a device of the type mentioned above.

The following description is given for illustrative purposes only and is in no way limitative, and must be read with reference to the attached single FIGURE that presents the basic diagram of a device conform with a possible embodiment of the invention.

DETAILED DESCRIPTION

Figure 1:
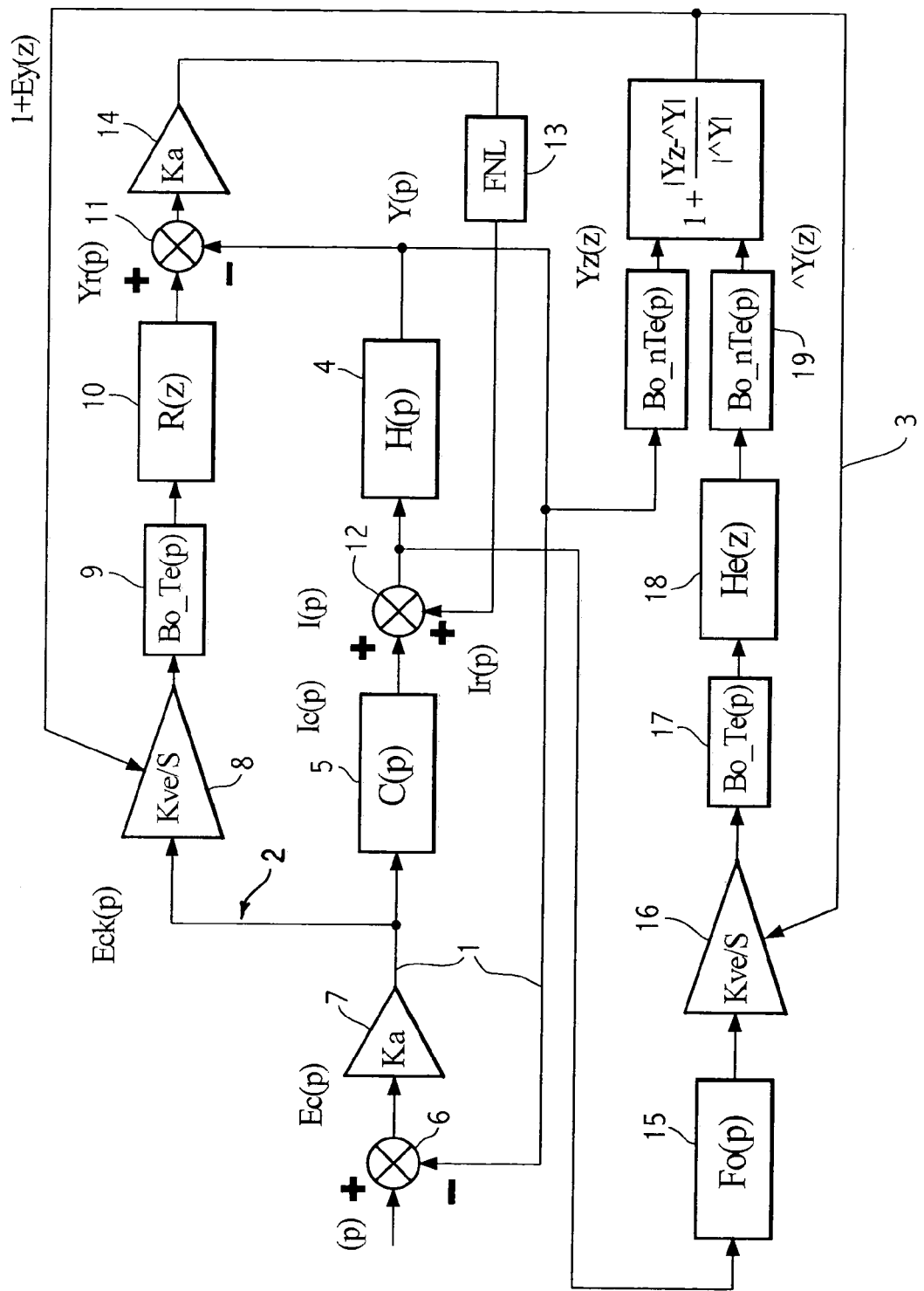
FIG. 1 illustrates a controlled device embodiment of the invention.

The device shown in FIG. 1 comprises a main loop 1, an internal model loop 2 and a parameter estimator 3.

The loop 1 comprises a servocontrolled system 4 (transfer function H(p)), and compensation means 5 (filter C(p)) that are arranged in the loop on the input side of the servocontrolled system 4.

The loop 1 also comprises subtraction means 6 into which firstly a control signal E(p) and secondly a signal Y(p) that is the output signal from loop 1, are applied at the input to the loop 1.

The output signal from these subtraction means 6 is an error signal Ec(p) corresponding to the difference between the control signal E(p) and the signal Y(p) at the output from the loop 1. The loop also comprises an amplifier 7 (gain Ka) interposed between the compensation means 5 and the subtraction means 6.

The Main Loop 1

The servocontrolled system 4 may for example be composed of:

a servovalve into which the current (isv) is input and a flow (q) is supplied at the output, and a servocontrol for which the input magnitude is the flow q and the output magnitude is the position y of the controlled mechanical part.

For example, the servovalve transfer function may be of the following type:

$$\frac{q}{isv} = \frac{kv}{\frac{1}{w_{0sv}^2}p^2 + 2\frac{\zeta_{sv}}{w_{0sv}}p + 1}$$

The linear transfer function of the servocontrol may be of the following type:

$$\frac{y}{q} = \frac{1}{S}\frac{1}{p}\frac{C_{vh}Mp^3 + (C_{vh}C_{vm} + MR_h)p^2 + (R_hC_{vm} + C_{vh}R_m)p + R_mR_h}{(C_{vh}C_{vm})Mp^3 + (M(R_m + R_h) + C_{vh}C_{vm})p^2 + (R_hC_{vm} + R_hR_mC_{vh})p + R_hR_m}$$

where M is the mass seen by the servocontrol and Rm is the global mechanical stiffness.

The parameters $\zeta_{sv}$ and $w_{0sv}$ may for example be damping and natural frequency parameters.

In general, the table at the end of the description defines the different parameters used in the remainder of this text and contains examples of their corresponding values, and should be referred to.

The compensation means 5 may for example be composed of a filter with holes to compensate for mechanical resonance. This filter may or may not be digitised. For example, it may correspond to the following transfer function:

$$C(p) = \frac{s^2 + 16.19s + 6617}{s^2 + 161.9s + 6617}$$

The gain Ka of the amplifier 7 is determined to improve the stability of the system. In the example illustrated in FIG. 1, this gain is fixed and the performances are adjusted by the reference model 2 and the estimator 3. In the event, the gain Ka may for example be equal to 400.

The Internal Model Loop

The internal model loop 2 receives the signal output from the amplifier 7 and transmits it to an assembly that comprises an amplifier 8 and a reference model 10 (R(z)). The reference model 10 receives signals transmitted by a blocker 9 (Be-Te) operating with a sampling period Te (for example in this case 10 ms).

The output (Yr(p)) from the reference model 10 is transmitted to subtraction means 11 that receive firstly this output and secondly the signal Y(p) output from loop 1. The error signal at the output from these subtraction means is injected into the loop 1, where it is summated to the signal that controls the servocontrolled device 4 (summation means 12).

Before being injected into the loop 1, the behavioural error signal may possibly be filtered (filter 13, that may for example be a non-linear filter) and amplified (amplifier 14 with gain Ka).

The summation made on the input of the servocontrol is used to adjust the process control as a function of an error with the theoretical model and to modify this control until the error between the model and the process tends towards zero, while remaining subordinate to the main loop.

The transfer function R(z) of the model 10 includes the reference model and the corrector filter, and for example is given by:

$$\frac{y_r}{Eck} = \frac{kve}{S}\frac{1}{s}\frac{-\frac{1}{2\pi f_0}s + 1}{\frac{1}{(2\pi f_1)^2}s^2 + \frac{2\xi}{2\pi f_1}s + 1}$$

This model is a clean second order with high damping $\xi$. The denominator cutoff frequency is f1. The numerator comprises a phase advance at frequency f0.

This phase advance is not compulsory, but it improves the system response by slowing the phase drop at high frequency.

Parameter Estimator

Principle

In the example illustrated in FIG. 1, the calculated difference between yr and y is amplified with the same gain as for the main loop. The resulting error is of the same order of magnitude as the error for the main loop. The correction using an internal model is very efficient when the model, and particularly the gain of the loop, are known with high precision. However, the gain of the main loop varies with the load (variation of the gain kv of the servovalve) and it can be considered that this variation is harmful to the performances. The use of an adapted gain compensates for load variations and thus avoids sacrificing system performances at minimum gain to give priority to stability of the system at maximum gain.

This role is performed by the parameter estimator described below, which is essentially a gain estimator.

For example, this estimator is created from simplified digitisation of the transfer function (for example, second order on second order, sampling period 10 ms). It estimates the output from process $\hat{y}$, then calculates the relative error between the process output and the estimated output in order to deduce an estimate of the loop gain.

The estimation algorithm readjusts the gain of the reference loop as a function of this new estimate ($\alpha k$). An optimum quadratic criterion can also be minimised.

Example Gain Estimator Structure

The signal corrected when input to the servovalve (ic) is applied to the input of the gain estimator. This signal is sent to a filter 15 which may for example be a first order filter at about 10 Hz, amplified at an amplifier 16 with controllable gain similar to amplifier 8 (gain kve/s) and then digitised by a blocker 17 with period Te (10 ms)).

At the output from this blocker 16, the signal is input to a transfer function that reuses the transfer function R(z) of the model in a simplified manner. For example, in the case of the transfer function given, above, the simplified transfer function He(z) is in the following form:

$$F(p) = \frac{\hat{y}}{q} = \frac{kve}{S}\frac{1}{p}\frac{1 + \frac{C}{2B}s}{\frac{M}{Rmg}s^2 + \frac{C}{2B}s + 1}$$

It is modelled discretely by Tustin's algorithm at 10 ms.

A digitised signal $\hat{y}$ is obtained by sub-sampling the output from this function with a period nTe*Te greater than Te (blocker 19a). This signal sampled at the output from the blocker 19a is sent with the output signal from loop 1, also sampled with the same sampling frequency (blocker 19b) on a device 20 that calculates the gain Kve/s necessary from amplifiers 8 and 16.

These amplifiers 8 and 16 are controlled by the output signal from this device 20.

Gain Convergence

Note that:

$$\begin{cases} y = kv * ic \\ \hat{y} = \hat{k}v * ic \end{cases}$$

and therefore that the relative position error can be written:

$$\varepsilon_{ry} = \frac{y - \hat{y}}{\hat{y}}$$

and also that:

$$1 + \varepsilon_{ry} = \frac{kv}{\hat{k}v}$$

The ratio between the real gain and the estimated gain is increased by a factor of 2 (ratio between the minimum gain and the maximum gain). Therefore, we can write:

$$\alpha_k = 1 + |\varepsilon_{ry}| < 2$$

This coefficient is used to update the gain kve in the estimator and the reference model loop.

kve will be multiplied by $\alpha_k$ such that $\alpha_k$ converges towards a limit calculated below.

$$\alpha_k = 1 + \left| \frac{y - \hat{y}}{\hat{y}} \right|$$

Since $k_{ve} < k_v$, then $$\alpha_k = 1 + \left| \frac{y - \hat{y}}{\hat{y}} \right| = 1 + \frac{k_v - k_{ve}\alpha_k}{k_{ve}\alpha_k} = \frac{k_v}{k_{ve}\alpha_k}$$

$$\alpha_k^2 = \frac{k_v}{k_{ve}}$$

Hence $$\alpha_k = \sqrt{\frac{k_v}{k_{ve}}}$$

Therefore, multiplying kve by this coefficient would give an approximate gain equal to:

$$k_{va} = \alpha_k k_{ve}$$

$$k_{va} = k_{ve}\sqrt{\frac{k_v}{k_{ve}}} = \sqrt{k_v k_{ve}}$$

If (12) is satisfied and $$\begin{cases} k_{vp} \leq k_v \leq k_{ve} \\ k_{ve} init = k_v \\ \frac{k_{vp}}{k_{ve}} < 2 \end{cases}$$

we then have:

$$1 \leq \alpha_k \leq \sqrt{\frac{k_{vks}}{k_{vp}}} < \sqrt{2}$$

and αk can also be written:

$$\begin{cases} \alpha_k = 1 + \varepsilon \\ \varepsilon \leq \sqrt{2} - 1 = 0.414 \end{cases}$$

$$\alpha_k^2 = (1 + \varepsilon)^2$$

According to (12), (15) and (19):

$$k_{va} \approx \sqrt{k_v \frac{k_v}{(1 + \varepsilon)^2}}$$

$$k_{va} \approx \frac{k_v}{1 + \varepsilon} < k_v$$

This final equation shows that the algorithm converges towards a value that is always less than the gain of the main loop. This condition enables better global stability since it reduces the performance of the correction by adaptation and prevents inversion of the process. The estimated gain is deliberately always less than the gain of the main loop. Therefore, the internal model loop will have a smooth and limited action and will never be able to reach the characteristics of the main loop.

General Comments

It will be noted that the loop 2 of the reference model is preferably of the open loop type and not the closed loop type. By correcting the gain of the reference model without modifying the main loop, the poles of the closed loops (main loop and internal model loop) will follow each other at the same time as the gains of their direct system. On the other hand, the range of a closed loop model is fixed and can thus be very different from the main loop. The simulation shows that the version containing a closed loop model is less robust to disturbance.

Furthermore, it will be noted that the system has the advantage that it can still function even if the loop 2 is disconnected. In this case, re-injection of the filtered error signal is forced to zero. The main loop 1 continues to operate using the conventional model.

Furthermore, other embodiments of the invention not specifically described can obviously be considered.

Obviously, it is possible for the output from the model loop 2 to be input into loop 1 at points other than the input to the servocontrolled system; in particular, summation means 15 may be placed for example at the input to the amplifier 7, or between the amplifier 7 and the compensation means 5.

| Parameter name | Symbol | Value | Unit |
|---|---|---|---|
| Electro-hydraulic servovalve | | | |
| Maximum control current | Imax | 8 | mA |
| Damping | $\zeta_{sv}$ | 0.9 | — |
| Natural frequency | $\omega_{0sv}$ | 314 | Rad/s |
| Stability gain | $k_{vs}$ | $1.34 \times 10^{-4}$ | m³/s/mA |
| Performance gain | $k_{vp}$ | $0.70 \times 10^{-4}$ | m³/s/mA |
| Nominal flow | Qn | 64 | l/mm |
| Flow at the performance point | Qf | 33.4 | l/mm |
| Mechanical load | | | |
| Attachment stiffness between the body and the fixed structure | Ra | $1.82 \times 10^8$ | N/m |
| Attachment stiffness between the surface and the piston rod | Rt | $1.00 \times 10^8$ | N/m |
| Global load stiffness | Rm | $6.45 \times 10^7$ | N/m |
| Mechanical load damping coefficient | Cvm | $6.62 \times 10^4$ | N/m/s |
| Surface mass | M | 6803 | kg |
| Global stiffness | Rg | $4.5 \times 10^7$ | N/m |
| Mechanical natural frequency | $\omega_{0m}$ | 81.3 | Rad/s |
| Mechanical damping ratio | $\zeta$ | 5 | % |
| Hydraulic jack | | | |
| Hydraulic damping coefficient | C | $5 \times 10^5$ | Pa·s |
| Global modulus | B | $8 \times 10^8$ | Pa |
| Chamber surface area | S | $6.119 \times 10^{-3}$ | m² |
| Chamber volume in the central position | V | $4.08 \times 10^{-4}$ | m³ |
| Hydraulic stiffness | Rh | $1.49 \times 10^4$ | N/m |
| Hydraulic damping coefficient | Cvh | $9.29 \times 10^4$ | N/m/s |
| Nominal extension distance | Yext | 0.066 | m |
| Nominal retraction distance | Yret | 0.045 | m |
| Weld friction | Fsec | 5000 | N |
| Computer | | | |
| Sampling period | Te | $10^{-2}$ | s |
| Number of sampling periods | nTe | — | — |
| Control gain | Ka | 920 | mA/m |
| Gain of the initial reference model | Kve | $K_{vp}$ | mA/m |
| Estimated position | $\hat{y}$ | — | m |

The invention claimed is:

1. A control device comprising a main servocontrol loop that comprises a servocontrolled system, and compensation means on the input side of the control device, said control device comprising an internal loop that receives a first signal derived from the main servocontrol loop as input, and that generates, as a function firstly of said first signal and secondly of a second signal characteristic of a parameter of the servocontrolled system, an error signal characteristic of the difference between said second signal and a theoretical signal determined using a model, said error signal being injected into the main servocontrol loop to correct the control of the servocontrolled system, wherein the internal loop and/or the main loop comprise at least one variable gain amplifier, and said control device comprises means for controlling the gain of said variable gain amplifier as a function of the second signal and a third signal derived from the main servocontrol loop from said servocontrolled system.

2. The control device according to claim 1, wherein the error signal generated by the internal loop is an error characteristic of the difference between the output from the servocontrolled system and a theoretically expected output determined using a model.

3. The control device according to claim 1, wherein it further comprises means at the output from the internal loop of non-linear filtering of said error signal.

4. The device according to claim 1, further comprising amplification means at the output from the comparison means in the internal loop, the gain of these amplification means corresponding to the gain of the amplifier in the main loop.

5. The device according to claim 1, wherein the gain of the main loop is fixed, the internal loop comprising a variable gain amplifier.

6. The device according to claim 1, wherein the gain of the amplifier in the main loop is fixed, the internal loop comprising a variable gain amplifier.

7. The device according to claim 1, wherein the means for controlling the gain of a variable gain amplifier comprise means for applying a simplified model of the internal loop model, to said third signal derived from the main servocontrolled loop.

8. The device according to claim 1, wherein the output of the internal loop is input to the main servocontrolled loop at the input of the servocontrolled system.

9. The device according to claim 1, wherein the internal loop is input to the main loop on the input side of the compensation means.

10. Electro-hydraulic flight control for an aircraft, comprising the control device according to claim 1.

* * * * *